US012476807B2

United States Patent
Murray et al.

(10) Patent No.: US 12,476,807 B2
(45) Date of Patent: Nov. 18, 2025

(54) BLINDED SEMI-STATIC ELLIPTIC CURVE DIFFIE-HELLMAN AUTHENTICATION PROTOCOL

(71) Applicant: NXP B.V., Eindhoven (NL)

(72) Inventors: Bruce Murray, Eastleigh (GB); Mario Lamberger, Graz (AT)

(73) Assignee: NXP B.V., Eindhoven (NL)

( * ) Notice: Subject to any disclaimer, the term of this patent is extended or adjusted under 35 U.S.C. 154(b) by 205 days.

(21) Appl. No.: 18/065,396

(22) Filed: Dec. 13, 2022

(65) Prior Publication Data

US 2024/0195620 A1  Jun. 13, 2024

(51) Int. Cl.
*G06F 21/00* (2013.01)
*H04L 9/08* (2006.01)
(Continued)

(52) U.S. Cl.
CPC .......... *H04L 9/3066* (2013.01); *H04L 9/0841* (2013.01); *H04L 9/3271* (2013.01)

(58) Field of Classification Search
CPC ... H04L 9/3066; H04L 9/0841; H04L 9/3271; H04L 9/003; H04L 9/085; H04L 9/3013;
(Continued)

(56) References Cited

U.S. PATENT DOCUMENTS 7,313,697 B2 * 12/2007 Meyer .................. H04L 9/3066
380/278
8,311,214 B2 * 11/2012 Buskey ................. H04L 9/3066
713/168
(Continued)

OTHER PUBLICATIONS

G. Gódor, et al "Elliptic Curve Cryptography Based Mutual Authentication Protocol for Low computational Complexity Environment", 2010 5th International Symposium on Wireless Pervasive Computing (ISWPC) (Year: 2010).*
(Continued)

*Primary Examiner* — Michael M Lee

(57) ABSTRACT

Various embodiments relate to a data processing system comprising instructions embodied in a non-transitory computer readable medium, the instructions for an elliptic curve cryptography authentication method based on an elliptic curve in a processor, the instructions, comprising: generating, by a verifier, a random challenge r; multiplying, by the verifier, the random challenge r by a basepoint G to produce R; sending an x coordinate of R to a prover; receiving an x-coordinate of a first point $P_1$ and a second point $P_2$ from the prover, wherein $P_1$ is based on a random share $q_1$ of the private key q of the prover and R, and wherein $P_2$ is based on a random share $q_2$ of the private key q and R; where $q=q_1-q_2$; finding a point $P_1'$ on the elliptic curve having an x-coordinate of the first point $P_1$; finding a point $P_2'$ on the elliptic curve having an x-coordinate of the second point $P_2$; and authenticating the prover when an x-coordinate of one of $(P_1'+P_2')$ and $(P_1'-P_2')$ matches an x-coordinate of r·Q, wherein Q is a public key of the prover.

17 Claims, 2 Drawing Sheets

(51) Int. Cl.
*H04L 9/30* (2006.01)
*H04L 9/32* (2006.01)

(58) Field of Classification Search
CPC ............. H04L 9/3218; H04L 2209/046; H04L 2209/08; H04L 2209/805
See application file for complete search history.

(56) References Cited

U.S. PATENT DOCUMENTS

| | | | |
|---|---|---|---|
| 9,584,320 | B1 | 2/2017 | Parkinson |
| 9,800,411 | B1* | 10/2017 | Brown ................. H04W 12/06 |
| 9,883,383 | B1 | 1/2018 | Chintalapudi |
| 10,389,702 | B2 | 8/2019 | Hu |
| 11,233,636 | B1 | 1/2022 | Peddada |
| 2007/0248224 | A1* | 10/2007 | Buskey ................. H04L 9/3271 380/30 |
| 2008/0165955 | A1* | 7/2008 | Ibrahim ................. H04L 9/0844 380/30 |
| 2009/0292921 | A1* | 11/2009 | Braun ..................... G06F 7/725 713/169 |
| 2012/0128157 | A1* | 5/2012 | Braun ................... G06F 21/445 380/270 |
| 2012/0288093 | A1 | 11/2012 | Murray |
| 2014/0286491 | A1* | 9/2014 | Atherton ............... H04L 9/0866 380/270 |
| 2015/0244525 | A1* | 8/2015 | McCusker ............ H04L 9/3218 380/44 |
| 2022/0029833 | A1* | 1/2022 | Poeppelmann ......... H04L 9/088 |

OTHER PUBLICATIONS

Fan, Jungeng et al.; "State-of-the-art of secure ECC implementations: a survey on known side-channel attacks and countermeasures"; 2010 IEEE International Symposium on Hardware-Oriented Security and Trust (HOST); Jun. 13-14, 2010, Anaheim, California; DOI: 10.1109/HST.2010.5513110.

Hamburg, Mike; "Fast and compact elliptic-curve cryptography"; IACR Cryptology ePrint Archive Paper 2012/309; Received Jun. 3, 2012; Last Revision Sep. 7, 2012; https://eprint.iacr.org/2012/309.

Renes, Joost et al.; "qDSA: Small and Secure Digital Signatures with Curve-based Diffie-Hellman Key Pairs"; IACR Cryptology ePrint Archive Paper 2017/518; Received Jun. 5, 2017, Last Revision Jan. 8, 2018; https://eprint.iacr.org/2017/518.

Ian Blake, Gerald Seroussi, Gadiel Seroussi, and Nigel Smart, Elliptic curves in cryptography, vol. 265, Cambridge university press, 1999, pp. 16-19 and 26-27.

Holger Bock, Michael Braun, Markus Dichtl, Erwin Hess, Johann Heyszl, Walter Kargl, Helmut Koroschetz, Bernd Meyer, and Hermann Seuschek, A milestone towards rfid products offering asymmetric authentication based on elliptic curve cryptography, Invited talk at RFIDsec (2008).

Michael Braun, Erwin Hess, and Bernd Meyer, Using elliptic curves on rfid tags, International Journal of Computer Science and Network Security 2 (2008), 1- 9.

BSI, Minimum Requirements for Evaluating Side-Channel Attack Resistance of Elliptic Curve Implementations, https: / /www. bsi. bund. de/SharedDocs/Downloads/DE/BSI/Zertifizierung/ Interpretationen/AIS_46_ECCGuide_e_pdf.

Jean-Sebastien Coron, Resistance against Differential Power Analysis for Elliptic Curve Cryptosystems, Cryptographic Hardware and Embedded Systems, First International Workshop, CHES'99, Worcester, MA, USA, Aug. 12-13, 1999, Proceedings (Qetin Kaya Ko<; and Christof Paar, eds.), Lecture Notes in Computer Science, vol. 1717, Springer, 1999, pp. 292-302.

Iso, ISO/IEC 29161-12:2015 Information technology—Automatic identification and data capture techniques—Part 12: Crypto suite ECG-DH security services for air interface communications.

Julio Cesar Lopez-Hernandez and Ricardo Dahab, Fast Multiplication on Elliptic Curves over GF(2m) without Precomputation, Cryptographic Hardware and Embedded Systems, First International Workshop, CHES'99, Worcester, MA, USA, Aug. 12-13, 1999, Proceedings (Qetin Kaya Ko~ and Christof Paar, eds.), Lecture Notes in Computer Science, vol. 1717, Springer, 1999, pp. 316-327.

* cited by examiner

US 12,476,807 B2

BLINDED SEMI-STATIC ELLIPTIC CURVE DIFFIE-HELLMAN AUTHENTICATION PROTOCOL

TECHNICAL FIELD

Various exemplary embodiments disclosed herein relate generally to efficient blinded semi-static elliptic curve Diffie-Hellman authentication protocol.

BACKGROUND

Authentication protocols are a vital building block in virtually every secure system nowadays. In resource constrained environments, design decisions need to be made to achieve the security requirements on the one side while respecting the resource constraints on the other side. The ECDH (Elliptic Curve Diffie Hellman) protocol is a versatile tool with many applications in cryptography. It can for example be used for offline authentication which is an important process in any supply chain and consumables use-case.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a data processing system including instructions embodied in a non-transitory computer readable medium, the instructions for an elliptic curve cryptography authentication method based on an elliptic curve in a processor, the instructions, including: generating, by a verifier, a random challenge r; multiplying, by the verifier, the random challenge r by a basepoint G to produce R; sending an x coordinate of R to a prover; receiving an x-coordinate of a first point $P_1$ and a second point $P_2$ from the prover, wherein $P_1$ is based on a random share $q_1$ of the private key q of the prover and R, and wherein $P_2$ is based on a random share $q_2$ of the private key q and R; where $q=q_1-q_2$; finding a point $P_1'$ on the elliptic curve having an x-coordinate of the first point $P_1$; finding a point $P_2'$ on the elliptic curve having an x-coordinate of the second point $P_2$; and authenticating the prover when an x-coordinate of one of $(P_1'+P_2')$ and $(P_1'-P_2')$ matches an x-coordinate of r·Q, wherein Q is a public key of the prover.

Various embodiments are described, further including receiving, by the verifier, the public key Q from the prover, where the public key Q is authenticated.

Various embodiments are described, further including receiving, by the verifier, the public key Q from a third party, where the public key Q is authenticated.

Further various embodiments relate to a data processing system including instructions embodied in a non-transitory computer readable medium, the instructions for an elliptic curve cryptography authentication method based on an elliptic curve in a processor, the instructions, including: receiving, by a prover, an x-coordinate of R, wherein R=r·G, where r a random challenge generated by a verifier and G is a basepoint; generating, by the prover, two shares $q_1$, $q_2$ of the private key q of the prover such that $q=q_1-q_2$; calculating $P_1=q_1·R$, calculating $P_2=q_2·R$; and sending an x-coordinate of $P_1$ and an x-coordinate of $P_2$ to the verifier.

Various embodiments are described, further including sending, by the prover, the public key Q of the prover, where the public key Q is authenticated.

Various embodiments are described, further including sending, by the prover, the public key Q to a third party, where the public key Q is authenticated.

Further various embodiments relate to an elliptic curve cryptography authentication method based on an elliptic curve, including: generating, by a verifier, a random challenge r; multiplying, by the verifier, the random challenge r by a basepoint G to produce R; sending an x coordinate of R to a prover; receiving an x-coordinate of a first point $P_1$ and a second point $P_2$ from the prover, wherein $P_1$ is based on a random share $q_1$ of the private key q of the prover and R, and wherein $P_2$ is based on a random share $q_2$ of the private key q and R; where $q=q_1-q_2$; finding a point $P_1'$ on the elliptic curve having an x-coordinate of the first point $P_1$; finding a point $P_2'$ on the elliptic curve having an x-coordinate of the second point $P_2$; and authenticating the prover when an x-coordinate of one of $(P_1'+P_2')$ and $(P_1'-P_2')$ matches an x-coordinate of r·Q, wherein Q is a public key of the prover.

Various embodiments are described, further including receiving, by the verifier, the public key Q from the prover, where the public key Q is authenticated.

Various embodiments are described, further including receiving, by the verifier, the public key Q from a third party, where the public key Q is authenticated.

Further various embodiments relate to an elliptic curve cryptography authentication method based on an elliptic curve, including: receiving, by a prover, an x-coordinate of R, wherein R=r·G, where r a random challenge generated by a verifier and G is a basepoint; generating, by the prover, two shares $q_1$, $q_2$ of the private key q of the prover such that $q=q_1-q_2$; calculating $P_1=q_1·R$, calculating $P_2=q_2·R$; and sending an x-coordinate of $P_1$ and an x-coordinate of $P_2$ to the verifier.

Various embodiments are described, further including sending, by the prover, the public key Q of the prover, where the public key Q is authenticated.

Various embodiments are described, further including sending, by the prover, the public key Q to a third party, where the public key Q is authenticated.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Authentication protocols are a vital building block in virtually every secure system nowadays. In resource constrained environments, design decisions need to be made to achieve the security requirements on the one side while respecting the resource constraints on the other side. A modified version of an elliptic curve-based authentication protocol is proposed with the unique feature that under certain security assumptions, the effort spent on the prover side of this protocol can be reduced at the cost of the verifier side. This approach is readily applicable when the prover is even more resource constrained than the verifier, e.g., an RFID tag that wants to authenticate to a reader.

The Elliptic Curve Diffie Hellman (ECDH) protocol is a versatile tool with many applications in cryptography. It can for example be used for offline authentication which is an important process in any supply chain and consumables use-case as well as in other use-cases. The complexity of this problem is usually based on the fact that there are significant resource constraints on the prover side, where chip area and energy consumption are guiding factors. Therefore, an authentication protocol is described herein that takes these resource constraints into account and allows the prover to perform simpler computations while the verifier is performing a few extra steps.

Figure 1:
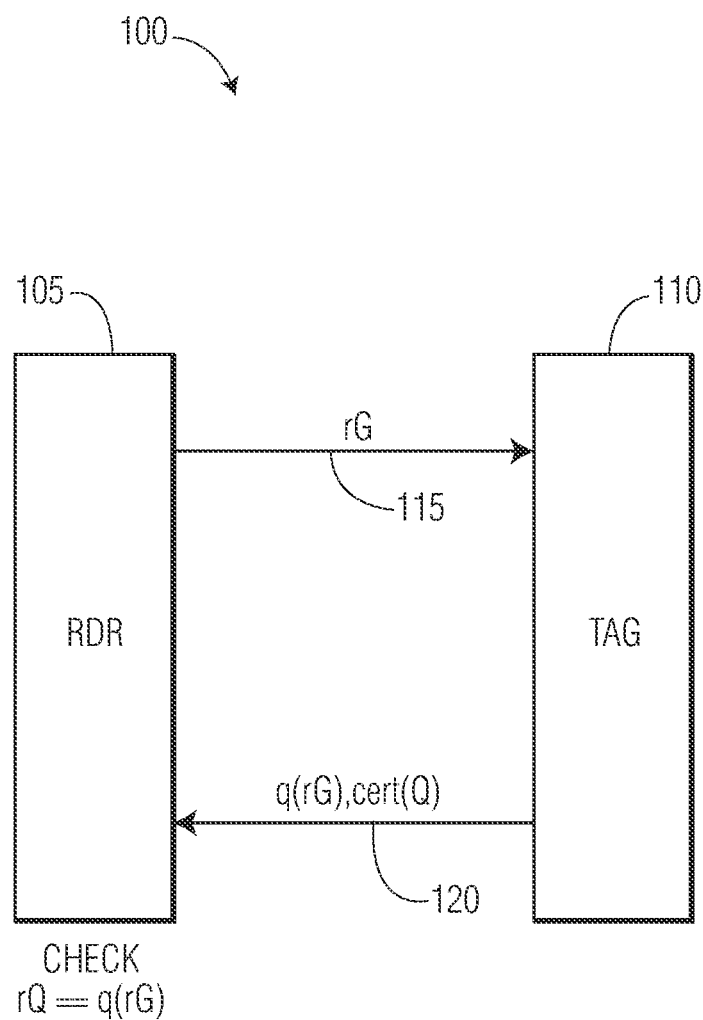
FIG. 1 illustrates a graphical description of the ECDH protocol as applied to a reader and a tag.

FIG. 1 illustrates a graphical description of the ECDH protocol as applied to a reader and a tag. The reader 105 may act as a verifier, and the tag 110 may act as a prover. The reader 105 randomly generates a value r and multiplies it with a base point G to generate challenge point r·G. The challenge point r·G is sent 115 to the tag 110. The tag 110 multiplies the challenge point by its private key q to obtain q(rG) to authenticate itself to the verifier. The tag 110 sends 120 q(rG) back to the reader 105. The tag 110 may also send a certificate for the tags public key Q associated with its private key q. The reader 105 may verify the tag by multiplying the value r with the tags public key Q. The value rQ is then compared to the received q(rG) value. As Q=r·G, if rQ==q(rG) the reader 105 has verified the tag 110.

There are multiple choices that the prover can make in order to implement the elliptic curve scalar multiplication as efficiently as possible. A common method is for example to use a Montgomery-ladder approach with co-Z projective coordinates (i.e., sharing the same Z-coordinate). In such a version of the protocol, one would only take the x-coordinate of the challenge point as input from the verifier and the answer of the prover would also just be the affine x-coordinate of the result or any form of projective coordinate representation, without the y-coordinate. In the description below, the x-coordinate is referenced, and it is intended that this may either be an affine x-coordinate or any form of equivalent projective coordinate representation.

It is a well-known problem, that side-channel analysis (SCA) attacks are a common threat to cryptographic implementations. There is a variety of countermeasures that are proposed to make SCA attacks more difficult. Here, blinding the ECC private key is a common approach and there are multiple proposals to do this.

One way to randomize the ECC private key is by performing an additive split blinding. That means two shares $q_1$, $q_2$ of the ECC private key q are created such that $q=q_1-q_2$. This could e.g. be achieved by adding a random number b to q. Then in order to compute q·(rG) one would compute $P_1=q_1·(rG)$ and also $P_2=q_2·(rG)$ and then the original result q(rG) can be achieved by subtracting the second result from the first:

$$P_1-P_2=q_1·(rG)-q_2·(rG)=q(rG).$$

This approach has the advantage that the original key q is not touched during the ECC computation. Of course, that comes at the price of doubling the computational effort (two scalar multiplications) and an additional subtraction.

A closer look at the latter subtraction will now be taken. As mentioned before, in highly efficient implementations only the x-coordinate of the input point is used during the computation. For each valid x-coordinate, there are two (except for points of order h (cofactor)) y-coordinates that constitute valid points on the elliptic curve. Now, if the prover has to perform the unblinding, i.e., the removal of the randomness from the computation to produce the original result that matches the ECDH protocol, a subtraction has to be performed by the prover. For this, the prover would have to compute a y-coordinate reconstruction which increases the complexity needed on the ECC implementation on the prover side.

In order to avoid this, allowing for ambiguity of the computation on the prover side and resolving this by adding complexity to the verification operation on the verifier side is proposed. Instead of computing the subtraction of the two intermediate results $P_1$ and $P_2$, the prover would just send the x-coordinates of these two points $(P_1)_x$ and $(P_2)_x$ back to the verifier.

The verifier would take these two x-coordinates and reconstruct one corresponding y-coordinate to find points $P_1'$ and $P_2'$ with $(P_1')_x=(P_1)_x$ and $(P_2')_x=(P_2)_x$. Now, with the original challenge r that the verifier sent out, the verifier simply computes the two elementary ECC operations $(P_1'+P_2')$ and $(P_1'-P_2')$ and verifies if the x-coordinate of either of these two points matches the x-coordinate of r·Q, i.e., the challenge r times the public key of the prover. This modified ECDH protocol allows for simplified blinded computations on the prover side while only adding little complexity to the verifier and sacrificing one bit of security for allowing the additional ambiguity.

It is desired to use the least intensive implementation choices possible for a blinded semi-static ECDH protocol used for authentication computations. In order to increase security, blinded computations are performed. For this purpose, an embodiment of an authentication protocol that is a modification of the ECDH protocol is proposed such that the verifier side is taking the x-coordinates of the two blinded computations as input. The verifier then reconstructs two points on the elliptic curve that allow the verifier to authenticate the prover based on the prover's public key. This has the benefit of moving complexity from the prover side to the verifier side without compromising security.

An authentication protocol allows a prover to prove to a verifier that it is authentic. There are multiple ways to do this, either based on symmetric or asymmetric cryptography. Usually, due to the extremely limited computational resources that can be achieved by RFID tags and in other applications, the choice is usually symmetric cryptography.

This leads to a complex and difficult key management process. Public key cryptography overcomes this problem. If public key cryptography is chosen in such an authentication scenario, efficiency optimized implementations will need to be developed to be implemented using limited computational resources. Also on protocol level, the selection should be as basic as possible in order to avoid unnecessary overhead. Therefore, the straight-forward ECDH protocol as depicted in FIG. 1 is assumed as the authentication protocol. The efficient EC arithmetic discussed above only uses the x-coordinate of the input point to implement the scalar multiplication. The y-coordinate is never used.

The core asset in this authentication protocol is the elliptic curve (EC)-private key that the prover is storing in non-volatile memory. In order to protect this asset, the prover needs to implement several layers of countermeasures. One common countermeasure is to introduce a blinding step in the private key computation, in order to not leak the private key during the EC scalar multiplication via a side-channel attack.

Before returning the final result of such a blinded operation, the prover either needs to unblind the result beforehand or select a blinding method where this is not necessary. This method would especially be costly if the elliptic curve arithmetic is implemented in $GF(2^n)$ which then needs additional circuitry for integer modular arithmetic. Note however that the authentication protocol disclosed herein is not limited to ECC operations over $GF(2^n)$ but works over all elliptic curves over finite fields.

Under the assumption that on the prover side a lot of additional complexity for these blinding operations should not be introduced, a method with small hardware costs might be to simply create two additive shares of the private key, q+b and b. An embodiment of an efficient blinded ECDH authentication protocol will now be described. The following set steps are first carried out. A prover T has in its non-volatile memory an elliptic curve key pair, consisting of a private key q and a public key $Q=q \cdot G$ where G is the basepoint of the elliptic curve parameter set. The public key may optionally be stored in the form of a public key certificate which is signed by a trusted third party in order to verify the authenticity of the public key. A verifier V also knows the ECC parameters.

Next the following authentication steps are carried out. The verifier V generates a random challenge r and sends the x-coordinate of $R=r \cdot G$ to the prover T. The prover T generates two random shares $q_1$, $q_2$ such that $q=q_1-q_2$ and computes the x-coordinates of the points $P_1=q_1 \cdot (rG)$ and $P_2=q_2 \cdot (rG)$, which are denoted by $(P_1)_x$ and $(P_2)_x$. The prover returns $(P_1)_x$ and $(P_2)_x$ and optionally the certificate of the prover's public key Q to the verifier V.

Then the following verification steps are carried out. If the prover T has transmitted a public key certificate for Q during step, the verifier V can verify the authenticity of the public key certificate of Q at any time before the final verification result. The verifier V uses $(P_1)_x$ and $(P_2)_x$ to find points $P_1'$ and $P_2'$ on the elliptic curve having these x-coordinates. This leads to reconstructing $P_1$ and $-P_1$ as well as $P_2$ and $-P_2$. Since the verifier V does not have additional information, they cannot decide if they are dealing with $P_i$ or $-P_i$ for $i \in \{1,2\}$. They may resolve this ambiguity by selecting either $P_1$ or $-P_1$ (same for $P_2$ and $-P_2$) and compute the two auxiliary points $A=P_1+P_2$ and $B=P_1-P_2$. The verifier V now takes the original challenge r and checks if either $(r \cdot Q)_x=A_x$ or $(r \cdot Q)_x=B_x$ holds. If one of those equations holds, the verifier V is assured that T possesses a private key q corresponding to Q. If both, the authenticity of the computations of the previous step by T and the authenticity of the public key Q (if applicable) are verified, V authenticates T.

The y-coordinate reconstruction may be realized in multiple ways. One possible instantiation would make use of solving a quadratic equation over a finite field. In case of binary field arithmetic in $GF(2^n)$ there can be other methods based on linear algebra. The authentication protocol embodiment does not depend on a particular choice of method how this reconstruction is done.

Performing complex cryptographic computations in restricted environments (like small RFID tags) can be very challenging. Especially when it comes to public key cryptography, any additional computation results in a significantly increased gate count and/or increased software code size. Therefore, the authentication protocol disclosed herein is targeted to keep things simple on the side of the resource constrained prover while letting the verifier deal with a slight increase in complexity. This allows addition of security on the prover side without the need of unnecessarily increasing the hardware complexity.

Figure 2:
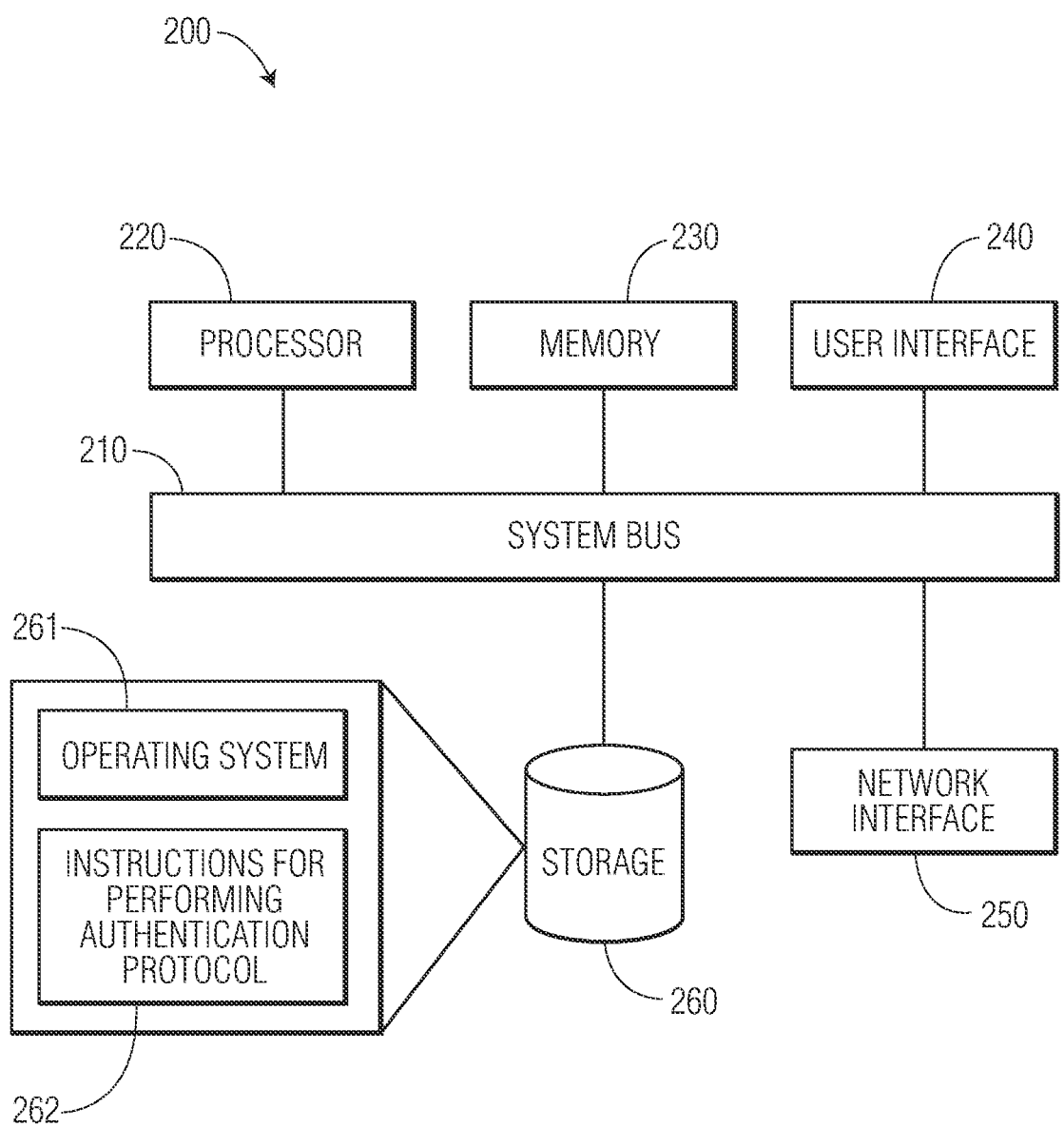
FIG. 2 illustrates an exemplary hardware diagram for implementing an authentication protocol.

FIG. 2 illustrates an exemplary hardware diagram 200 for implementing an authentication protocol. The exemplary hardware 200 may correspond to either the reader/verifier or the tag/prover of FIG. 1. As shown, the device 200 includes a processor 220, memory 230, user interface 240, network interface 250, and storage 260 interconnected via one or more system buses 210. It will be understood that FIG. 2 constitutes, in some respects, an abstraction and that the actual organization of the components of the device 200 may be more complex than illustrated.

The processor 220 may be any hardware device capable of executing instructions stored in memory 230 or storage 260 or otherwise processing data. As such, the processor may include a microprocessor, microcontroller, graphics processing unit (GPU), neural network processor, field programmable gate array (FPGA), application-specific integrated circuit (ASIC), or other similar devices.

The memory 230 may include various memories such as, for example L1, L2, or L3 cache or system memory. As such, the memory 230 may include static random-access memory (SRAM), dynamic RAM (DRAM), flash memory, read only memory (ROM), or other similar memory devices.

In alternative embodiments, the processor 220 and memory 230 may be replaced by a state machine. This allows for a simpler and efficient hardware design.

The user interface 240 may include one or more devices for enabling communication with a user. For example, the user interface 240 may include a display, a touch interface, a mouse, and/or a keyboard for receiving user commands. In some embodiments, the user interface 240 may include a command line interface or graphical user interface that may be presented to a remote terminal via the network interface 250.

The network interface 250 may include one or more devices for enabling communication with other hardware devices. For example, the network interface 250 may include a network interface card (NIC) configured to communicate according to the Ethernet protocol or other communications protocols, including wireless protocols. Additionally, the network interface 250 may implement a TCP/IP stack for communication according to the TCP/IP protocols. Various alternative or additional hardware or configurations for the network interface 250 will be apparent.

The storage 260 may include one or more machine-readable storage media such as read-only memory (ROM), random-access memory (RAM), magnetic disk storage media, optical storage media, flash-memory devices, or similar storage media. In various embodiments, the storage 260 may store instructions for execution by the processor 220 or data upon with the processor 220 may operate. For example, the storage 260 may store a base operating system 261 for controlling various basic operations of the hardware 200. Storage 260 may include instructions 262 for carrying out the authentication protocol described herein.

It will be apparent that various information described as stored in the storage 260 may be additionally or alternatively stored in the memory 230. In this respect, the memory 230 may also be considered to constitute a "storage device" and the storage 260 may be considered a "memory." Various other arrangements will be apparent. Further, the memory 230 and storage 260 may both be considered to be "non-transitory machine-readable media." As used herein, the term "non-transitory" will be understood to exclude transitory signals but to include all forms of storage, including both volatile and non-volatile memories.

The system bus 210 allows communication between the processor 220, memory 230, user interface 240, storage 260, and network interface 250.

While the host device 200 is shown as including one of each described component, the various components may be duplicated in various embodiments. For example, the processor 220 may include multiple microprocessors that are configured to independently execute the methods described herein or are configured to perform steps or subroutines of the methods described herein such that the multiple processors cooperate to achieve the functionality described herein. Further, where the device 200 is implemented in a cloud computing system, the various hardware components may belong to separate physical systems. For example, the processor 220 may include a first processor in a first server and a second processor in a second server.

As used herein, the term "non-transitory machine-readable storage medium" will be understood to exclude a transitory propagation signal but to include all forms of volatile and non-volatile memory. When software is implemented on a processor, the combination of software and processor becomes a single specific machine. Although the various embodiments have been described in detail, it should be understood that the invention is capable of other embodiments and its details are capable of modifications in various obvious respects.

Because the data processing implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Any combination of specific software running on a processor to implement the embodiments of the invention, constitute a specific dedicated machine.

It should be appreciated by those skilled in the art that any block diagrams herein represent conceptual views of illustrative circuitry embodying the principles of the invention.

What is claimed is:

1. A data processing system comprising a processor and a non-transitory computer readable medium storing instructions executable by the processor for an elliptic curve cryptography authentication method based on an elliptic curve comprising:
   generating, by the processor of a verifier, a random challenge r;
   multiplying, by the processor of the verifier, the random challenge r by a basepoint G of an elliptic curve to produce a challenge value R;
   sending, using an interface coupled to the processor, a first radio frequency signal including an x coordinate of the challenge value R to a prover comprising a radio frequency identifier (RFID) device;
   receiving, via a second radio frequency signal at the interface, a first x-coordinate of a first point $P_1$ and a second x-coordinate of a second point $P_2$ from the prover, wherein the first point $P_1$ is based on a first random and the challenge value R, wherein $P_2$ is based on a second random value and the challenge value R, and wherein the first random value is related to the second random value at least by a random share of a private key q;
   finding, by the processor, a first elliptic point $P_1'$ on the elliptic curve having the first x-coordinate of the first point $P_1$;
   finding, by the processor, a second elliptic point $P_2'$ on the elliptic curve having the second x-coordinate of the second point $P_2$;
   determining, by the processor, the private key q of the prover corresponds to a public key Q of the prover when an x-coordinate of one of a sum of the first and second elliptic points ($P_1'+P_2'$) or a difference of the first and second elliptic points ($P_1'-P_2'$) matches an x-coordinate of a product of the random challenge r and a public key Q of the prover;
   authenticating the prover including the RFID device, by the processor of the verifier including an RFID reader, based on determining that private key q corresponds to the public key Q; and
   wherein the public key Q is related to the private key q as a product of the private key q and the basepoint G of the elliptic curve (Q=q*G).

2. The data processing system of claim 1, further comprising receiving, by the interface of the verifier via the second radio frequency signal, the public key Q from the prover, where the public key Q is authenticated.

3. The data processing system of claim 1, further comprising receiving, by the interface of the verifier via the second radio frequency signal, the public key Q from a third party, where the public key Q is authenticated.

4. The data processing system of claim 1, further comprising authenticating the prover, by the processor of the verifier, when the private key q corresponds to the public key Q and the x-coordinate of either of sum of the first and second elliptic points or the difference of the first and second elliptic points matches the product of the random challenge r and the public key Q.

5. The data processing system of claim 1, wherein:
the first random number is $q_1$;
the second random number is $q_2$; and
the private key q is a difference of $q_1$ and $q_2$ such that $q=q_1-q_2$.

6. The data processing system of claim 1, wherein the instructions executable by the processor for an elliptic curve cryptography authentication method based on an elliptic curve further comprising:
determine a random number b in response to receiving the challenge value R;
determine a first key portion $q_1$ and a second key portion $q_2$ related to the private key q such that the private key q is equal to a difference between the first key portion q1 and the second key portion q2 such that $q=q_1-q_2$; and
wherein determining the first random number comprises determining a first sum of the first key portion $q_1$ and the random number b;
wherein determining the second random number comprises determining a second sum of the second key portion $q_2$ and the random number b;
wherein the first point $P_1$ is based on the challenge value R and the first random number such that $P_1=(b+q_1)R$; and
wherein the second point $P_2$ is based on the challenge value R and the second random number such that $P_2=(b+q_2)R$.

7. A data processing system comprising a processor and a non-transitory computer readable medium storing instructions executable by the processor of a prover for an elliptic curve cryptography authentication method comprising:
receiving, from a verifier device by an interface of the prover, a first radio frequency signal including an x-coordinate of a challenge value R, wherein R=r·G, where r is a random challenge generated by a verifier and G is a basepoint of an elliptic curve;
determining, by a processor of the prover comprising a radio frequency identifier (RFID) tag, a first random value $q_1$ related to a private key q of the prover;
determining, by the processor, a second random value $q_2$ related to the first random value $q_1$ and the private key q;
calculating, by the processor of the prover, a first x-coordinate of a first point $P_1$ on the elliptic curve based on the x-coordinate of the challenge value R and the first random value $q_1$;
calculating, by the processor of the prover, a second x-coordinate of a second point $P_2$ on the elliptic curve based on the x-coordinate of the challenge value R and the second random number $q_2$;
sending, from the processor via the interface, a second radio frequency signal including the first x-coordinate of the first point $P_1$ and the second x-coordinate of the second point $P_2$ to the verifier; and sending, by the interface of the prover, the second radio frequency signal including a public key Q of the prover, where the public key Q is authenticated; and
wherein the prover is authenticated by the verifier based on the first point $P_1$, the second point $P_2$, and the public key Q.

8. The data processing system of claim 7, wherein sending the second radio frequency signal further comprising sending, by the interface of the prover, the public key Q to a third party, where the public key Q is authenticated.

9. The data processing system of claim 7, wherein:
the first random value is $q_1$;
the second random value is $q_2$; and
the private key q is equal to a difference between $q_1$ and $q_2$ such that $q=q_1-q_2$.

10. The data processing system of claim 7, wherein the instructions are executable by the processor of the prover for the elliptic curve cryptography authentication method further comprising:
determining, by the processor of the prover, a blinding value b;
determining, by the processor, a first key portion $q_1$ and a second key portion $q_2$ related to the private key q such that the private key q is equal to a difference between the first key portion $q_1$ and the second key portion $q_2$ such that $q=q_1-q_2$; and
wherein:
determining the first random number comprises determining, by the processor, a first sum of the first key portion $q_1$ and the blinding value b;
determining the second random number comprises determining, by the processor, a second sum of the second key portion $q_2$ and the blinding value b;
the first point $P_1$ is based on the challenge value R and the first random number such that $P_1=(b+q_1)R$; and
the second point $P_2$ is based on the challenge value R and the second random number such that $P_2=(b+q_2)R$.

11. An elliptic curve cryptography authentication method based on an elliptic curve, comprising:
generating, by a processor of a verifier, a random challenge r;
multiplying, by the processor of the verifier, the random challenge r by a basepoint G of the elliptic curve to produce a challenge value R;
sending, using an interface of the verifier, a first radio frequency signal including an x coordinate of the challenge value R to a prover;
receiving, at the interface, a second radio frequency signal including a first x-coordinate of a first point $P_1$ and a second x-coordinate of a second point $P_2$ from the prover, wherein the first point $P_1$ is based on a first random value related to a private key q of the prover and the challenge value R, and wherein the second point $P_2$ is based on a second random value and the challenge value R, the second random value is related to the first random value and the private key q;
finding, using the processor, a first elliptic point $P_1'$ on the elliptic curve based on the first x-coordinate of the first point $P_1$;
finding, using the processor, a second elliptic point $P_2'$ on the elliptic curve based on the second x-coordinate of the second point $P_2$; and
determining, by the processor of the verifier, the private key q of the prover corresponds to a public key Q of the prover when the processor determines an x-coordinate of one of a sum of the first and second elliptic points $(P_1'+P_2')$ or a difference between the first or second elliptic points ($P_1'-P_2'$) matches an x-coordinate of a product of the random challenge r and a public key Q of the prover;

authenticating the prover including a radio frequency identifier (RFID) device based on determining by the processor that private key q corresponds to the public key Q; and wherein the public key Q is related to the private key q as a product of the private key q and the basepoint G of the elliptic curve (Q=q*G).

12. The elliptic curve cryptography authentication method of claim 11, further comprising receiving, at the interface of the verifier, the second radio frequency signal including the public key Q from the prover, where the public key Q is authenticated.

13. The elliptic curve cryptography authentication method of claim 11, further comprising receiving, at the interface of the verifier, the second radio frequency signal including the public key Q from a third party, where the public key Q is authenticated.

14. The elliptic curve cryptography authentication method of claim 11, further comprising authenticating the prover, by the processor of the verifier, when the private key q corresponds to the public key Q and the x-coordinate of either of sum of the first and second elliptic points or the difference of the first and second elliptic points matches the product of the random challenge r and the public key Q.

15. An elliptic curve cryptography authentication method based on an elliptic curve, comprising:

receiving, by an interface of a prover, an x-coordinate of a challenge value R from a verifier, wherein R=r·G, where r a random challenge generated by the verifier and G is a basepoint of the elliptic curve;

generating, by a processor of the prover, a random number b in response to the receiving the x-coordinate of the challenge value R;

determining, by the processor, first and second shares $q_1$, $q_2$ of a private key q of the prover such that $q=q_1-q_2$;

determining, by the processor, a first random number based on a first sum of the random number b and the first share $q_1$;

determining, by the processor, a second random number based on a second sum of the random number b and the second share $q_2$;

calculating, by the processor, a first x-coordinate of a first point $P_1$ on the elliptic curve based on the first sum and the x-coordinate of R such that $P_1=(q_1+b)\cdot R$;

calculating, by the processor, a second x-coordinate of a second point $P_2$ on the elliptic curve based on the second sum and the x-coordinate of the challenge value R such that $P_2=(q_2+b)\cdot R$; and sending, by the processor of the prover to the verifier via the interface, a radio frequency signal including the first x-coordinate of the first point $P_1$ and the second x-coordinate of the second point $P_2$;

sending, by the prover, a public key Q of the prover, where the public key Q is authenticated; and wherein the prover is authenticated by a processor of the verifier based on one or more of the first point $P_1$, the second point $P_2$, or the public key Q.

16. The elliptic curve cryptography authentication method of claim 15, further comprising sending, by the prover, the public key Q to a third party, where the public key Q is authenticated.

17. The elliptic curve cryptography authentication method of claim 15, wherein the public key Q is related to the private key q as a product of the private key q and the basepoint G of the elliptic curve (Q=q*G).

* * * * *